April 29, 1969 W. MESSINGER ET AL 3,440,725
MOUNTING OF DRY SHAVER SHEARING FOIL
Filed June 29, 1966
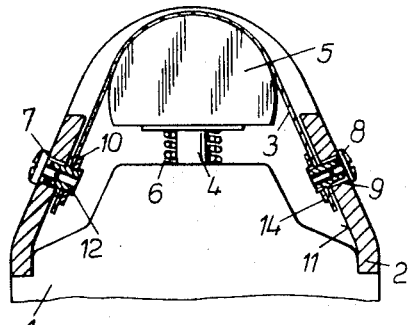
FIG. 1
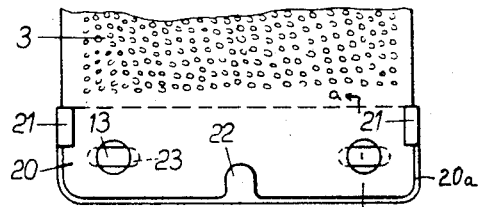
FIG. 6
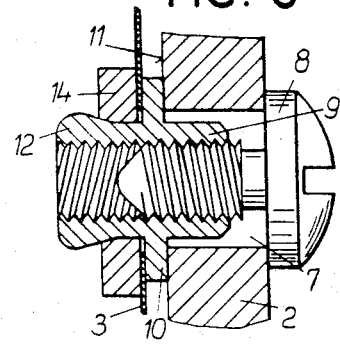
FIG. 2
FIG. 3
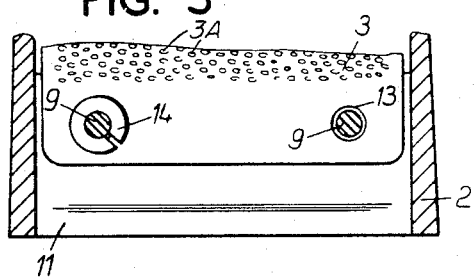
FIG. 4
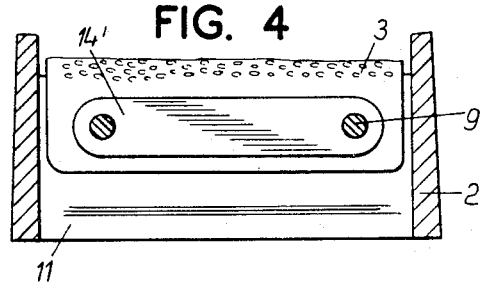
FIG. 7  FIG. 8
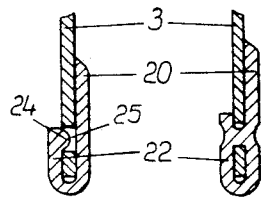
FIG. 5
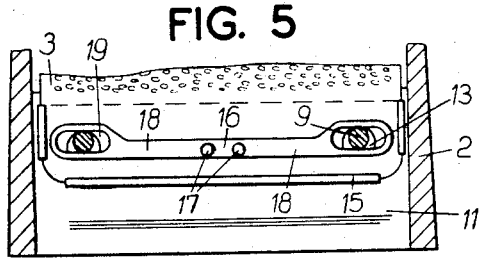
FIG. 9
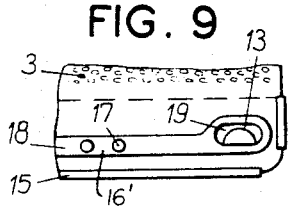
INVENTOR:
Werner Messinger
Robert Wick
BY
ATTORNEY

United States Patent Office 3,440,725
Patented Apr. 29, 1969

3,440,725
MOUNTING OF DRY SHAVER SHEARING FOIL
Werner Messinger and Robert Wich, Frankfurt am Main, Germany, assignors to Braun Aktiengesellschaft, Frankfurt am Main, Germany
Continuation-in-part of application Ser. No. 294,925, July 15, 1963. This application June 29, 1966, Ser. No. 561,598
The portion of the term of the patent subsequent to Aug. 30, 1983, has been disclaimed
Claims priority, application Germany, July 24, 1962, B 68,148
Int. Cl. B26b 19/38
U.S. Cl. 30—43.91        5 Claims

ABSTRACT OF THE DISCLOSURE

The foil of a dry shaver is provided with openings which receive, with substantial clearance, pins carried by the frame so that the foil is universally movable relative to the frame. Resilient biasing members in the form of wires, tongues, strips or arms are used to urge the foil into frictional engagement with the frame. Such resilient biasing means are carried by the frame and/or by the foil.

---

This is a continuation-in-part of our copending application Ser. No. 294,925 filed on July 15, 1963 and which on Aug. 20, 1966, matured into U.S. Patent No. 3,269,008.

The present invention relates to shavers and especially to so-called dry shavers such as electric razors or the like.

Structures of this type generally include a frame which carries a reciprocatory cutter engaged by a foil formed with openings through which the whiskers extend to engage the cutter which by reciprocation relative to the foil provides with the latter a shearing action which cuts the whiskers.

At the same time a considerable problem is involved in such shavers because of the lack of precise cooperation between the foil and the cutter. Because of inaccuracies in the manufacture of the structure the foil does not always have a uniform sliding contact with the cutter, particularly at the regions where the ends of the cutter are located and during a change in the direction of movement of the cutter. Because of the inherent inaccuracies in the manufacture of such structures the cutter will not have a uniform pressure with respect to the shearing foil and in some places the shearing foil may even be raised away from the cutter which causes stubble of the beard to pass through the openings of the foil and to be injured during the shaving process.

It is accordingly a primary object of the present invention to provide a shaving apparatus of the above type which will guarantee that there is a desired uniform sliding contact between the cutter and the shearing foil.

Another object of the present invention is to provide a construction which will enable the shearing foil to automatically follow the outline of the cutter so as to provide a uniform contact therewith.

It is furthermore an object of the present invention to provide a structure of the above type wherein the shearing foil itself is properly reinforced so that it cannot become damaged particularly at places where it is formed with openings for connection of the foil to the frame of the shaver.

It is also an object of the present invention to provide a structure which is adjustable at the place where the foil is connected to the frame so as to compensate in this way for manufacturing tolerances.

It is also an object of the present invention to provide a structure where certain parts perform a multiplicity of functions enabling the number of parts to be kept to a minimum.

Moreover, it is an object of the present invention to provide a relatively simple structure which will reliably urge the shearing foil into engagement with the cutter while freeing the shearing foil for movement in opposition to a relatively light resistance relative to the frame of the shaver so that the foil can automatically adapt itself to the cutter.

With these objects in view the invention includes, in a shaving apparatus, a frame means having a pair of fastening portions each of which carries a plurality of pins which form part of the frame means and which are stationary relative to the remainder of the frame means. A cutter means is carried by the frame means, and a shearing foil extends around and engages the cutter means, and this shearing foil has a pair of free end portions which overlap the fastening portions of the frame means and which are respectively formed with openings through which the pins pass with substantial clearance. A means is operatively connected to the pins for urging the free end portions of the foil against the frame means providing a relatively light frictional resistance to movement of the foil relative to the frame means so that in this way the foil can automatically adapt itself, by automatic movement relative to the frame means, to the cutter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional, fragmentary, diagrammatic side elevation of a shaver, showing that part of the shaver which includes the structure of the invention;

FIG. 2 is an enlarged fragmentary sectional view showing the details of a fastening portion and the structure for placing part of a shearing foil in engagement therewith;

FIG. 3 is a transverse sectional view showing fragmentarily the manner in which a free end portion of a foil cooperates with pins, the left portion of FIG. 3 showing also structure for pressing a corner of the foil against the frame of the shaver;

FIG. 4 is a fragmentary transverse partly sectional illustration of another means for engaging the foil to provide a relatively light frictional resistance to movement of the foil relative to the frame means;

FIG. 5 shows still another embodiment which will not only provide a light frictional resistance to movement of the foil but which will in addition yieldably and resiliently urge the foil against the cutter;

FIG. 6 is a fragmentary elevation of an end portion of the shearing foil showing connected thereto a structure for joining the foil with the frame of the shaver;

FIG. 7 is a fragmentary sectional elevation showing one possible construction for connecting the strip of FIG. 6 to the foil;

FIG. 8 is a fragmentary sectional illustration of another embodiment of a structure for connecting a strip of FIG. 6 to the foil;

FIG. 9 shows the arrangement of a springy member relative to the foil, the embodiment of FIG. 9 being similar to that of FIG. 5 except for the relationship between the parts;

Figure 10:
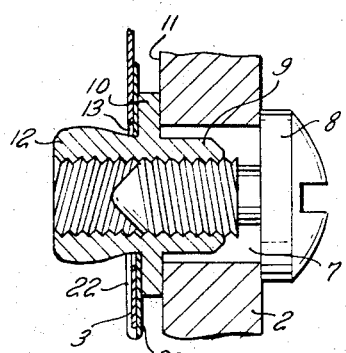
FIG. 10 is an enlarged fragmentary sectional view, seen in the direction of arrows a—a of FIG. 6, showing the details of a fastening portion and the structure for retaining thereon a part of the shearing foil of FIG. 6.

Referring now to FIG. 1, there is shown the housing 1 of a dry shaving apparatus, this housing forming a frame means and including a pair of fastening portions 2 in the form of flanges which are integral with the remainder of the housing or frame 1, these fastening portions or flanges 2 extending upwardly and being inclined toward each other, as viewed in FIG. 1. Within the housing or frame 1 there is located, as is well known in the art, a driving motor which is unillustrated and which is operatively connected to the shaft or pin 4 which carries cutter means 5 which is also well known in the art, the arrangement being such that this cutter means which is carried by the frame means 1, 2 is reciprocated back and forth along cutting strokes in a direction perpendicular to the plane of FIG. 1. A spring 6, which is also conventional, is coiled about the pin or shaft 4 and engages with its lower end, as viewed in FIG. 1, an upwardly directed end face of the housing or frame 1, and also engages the underside of the cutter means 5, so that this spring serves to urge the cutter means 5 against a shearing foil 3. This shearing foil 3 is made of a relatively thin highly flexible sheet of metal and at its upper portion, as viewed in FIG. 1, which extends around and engages the cutter 5 this foil is formed with a plurality of openings 3A (see FIG. 3) through which the whiskers can pass to engage the cutter 5 so as to be sheared off by the slidable shearing action which is provided between the cutter means 5 and the shearing foil 3, as is also well known in the art. Thus, the spring 6 urges the cutter 5 against the inner surface of the curved foil 3, in the manner shown in FIG. 1.

Because of inherent inaccuracies in the manufacture of a structure as described above, the foil 3 cannot be precisely fixed to the frame 1, 2 and it may be slightly twisted or non-uniformly applied against the cutter 5 in such a way that an undesirable non-uniform contact between the cutter 5 and the foil 3 results, and very undesirable shaving action will necessarily follow. With the structure of the invention the foil 3 is fastened to the frame means 1, 2 in such a way that the foil 3 can automatically adapt itself to the cutter 5 so as to provide a uniform sliding engagement therewith guaranteeing proper shearing of the stubble of the beard.

The structure of the invention includes a plurality of pins which form part of the frame means and which are capable of being adjustably fixed to the remainder of the frame means. As is apparent from FIGS. 1 and 2, each of the fastening flanges 2 of the frame means is formed with a pair of openings 7, and these openings are respectively aligned with a pair of corner portions of the foil 3 at a free end portion thereof which overlaps a fastening flange 2. The adjustable fixing means includes a plurality of screw members 8 which extend with shanks freely into the openings 7 so that these screw members 8 are shiftable in all directions with respect to the openings 7 while at the same time the heads of the screw members 8 are large enough to guarantee contact with the exterior surface of the flange 2. The several screw members 8 respectively extend threadedly into threaded bores of elongated pins 9 which also extend with clearance into the several openings 7, respectively, as is particularly apparent from FIG. 2, and each of the pins 9 is formed with an annular projection 10 engaging the inner surface of the fastening flange 2. Thus, the inner surface 11 of the flange 2 is shown in FIG. 2 engaged by the annular projection 10 of the pin 9. With this construction it is possible before tightening the screws 8 to adjust the positions of the several pins 9 of the frame means relative to the fastening portions or flanges 2 of the frame means, within the limits afforded by the clearance of the pins within the openings 7, so that in this way the means for adjusting fixing the pins 9 to the fastening flanges 2 is able to compensate at least partly for manufacturing inaccuracies.

When the nuts or pins 9 are tightly pressed at their projections 10 against the surfaces 11 of the flanges 2 by the screw members 8, these pins 9 remain stationary and immovable with respect to the remainder of the frame means. As is apparent particularly from FIG. 2, each pin 9 has an enlarged free end portion 12 the configuration of which is clearly illustrated in FIG. 2. These enlarged free end portions 12 of the pins 9 form the portions of the pins which respectively extend with substantial clearance through openings 13 respectively formed in the free end portions of the foil 3 which respectively overlap the fastening flanges 2, and the clearance of the pins 9 in the openings 13 which are respectively located at the corner portions of the foil 3 enable the latter to have a certain freedom of movement relative to the pins so that with the structure described below the foil 3 is capable of adjusting itself automatically relative to the cutter 5.

As is apparent from FIGS. 1 and 3 the substantial clearance of the pins 9 in the circular openings 13 enables the foil 3 to shift relative to the frame in planes parallel to the fastening portions or flanges 2, these being the planes in which the free end portions of the foil 3 are respectively located, and at each of the four corner portions the foil 3 is capable of adjusting itself independently of the other corner portions so that an independent adjustment can take place at any one of the corner portions of the foil 3.

Also in accordance with the present invention there is provided a means for urging the foil 3 against the frame means with a relatively light force of friction which resists adjusting movement of the foil 3, this resistance being sufficient to eliminate the possibility of any vibrations in the foil 3 during operation of the reciprocatory cutter 5 while at the same time being insufficient to prevent automatic adjustment of the foil 3. This means for urging the foil 3 frictionally against the frame means includes, in the example of FIGS. 1-3, elastic split rings 14 which are capable of being easily pushed by the operator over the enlarged ends 12 of the pins 9 until they resiliently surround the pins 9 and because of the inclination of the exterior surface of the pins 9 at their enlarged portions 12 these yieldable rings 14 constantly tend to move toward the projections 10 thus providing the relatively light frictional contact between the foil 3 and the projections 10. As was pointed out above these projections 10 together with the pins 9 which are fixed relative to the frame means 1, 2 form part of the frame means, and, indeed, it is possible, if desired, to provide a structure where the foil 3 directly engages the fastening flanges 2, although the illustrated construction is preferred because of the possibility of adjusting the pins 9 relative to the frame before fixing the pins 9 thereto, so that in this way it is possible to compensate for manufacturing inaccuracies to a substantial extent even before the foil 3 is attached to the pins 9. Thus, if it is desired to eliminate the adjustability of the pins 9 relative to the fastening flanges 2, these flanges may simply be provided with integral pins projecting therefrom and devoid of any projections 10, in which case the foil 3 would bear directly against the surface 11. Moreover, it is not essential that the means for holding the foil on the pins 9 and pressing the latter against the projections 10 take the form of the split rings 14. Any yieldable resilient caps, knobs, or the like can be pushed over the budging portion 12 of each pin 9 for engaging the foil 3 and pressing it against the projection 10. Also, if desired, each ring 14 may be provided at its inner periphery with an annular projection which extends into the opening 13 to an extent which will not undesirably limit the movement of the foil 3 relative to the pin 9.

In any case, the shearing foil 3 is connected at its corner portions to the frame means in such a way that it is capable of independent adjustable movement automatically at each of its corner portions so as to compensate not only for localized manufacturing tolerances, thus eliminating non-uniform pressure of the cutter means 5 against the foil, but also the yieldability of the foil 3 is such that it is capable of yielding together with the cutter means toward the frame 1 as a result of the shaving pressure with which the operator presses the foil 3 against his beard, and in either case the cutter is capable of having a uniform sliding engagement throughout the working area with respect to the shearing foil 3. The pressure of the rings 14 against the foil 3 prevents vibration thereof when the foil 3 is not seated fully against the projection 10 of each pin 9. For example, it is possible during use of the shaver for the pressure applied to the foil 3 to raise the foil momentarily at its portion surrounding an opening 13 away from the annular projection 10, and the ring 14 will at such a time by its pressure against the foil 3 prevent undesirable vibration thereof. Such a loose seating of the foil 3 on any one of the annular projections 10 is, however, only momentary and results from the manner in which the shaver is operated. FIG. 3 illustrates how the structure appears when looking toward the surface 11 of a fastening flange 2, and on the right of FIG. 3 there is shown the relationship between the opening 13 and the pin 9 with the ring 14 removed, while the ring 14 is shown at the left pin 9 of FIG. 3. In FIG. 3 as well as in the remaining figures described below the pins 9 are illustrated as simple pins for the sake of simplicity and clarity, although it is to be understood that in all embodiments the pin structure is as illustrated in FIG. 2 and described above, except of course the embodiments disclosed in FIGS. 11–16 where a simple pin may suffice.

As is apparent from FIG. 4, instead of using individual split rings 14, it is possible to provide for each pair of pins 9 carried by each fastening flange 2 a single elongated elastic strip 14' formed with a pair of openings capable of receiving the pins 9, and such an elastic strip can be pushed over the enlarged portions 12 of the pins 9 so as to also maintain the foil 3 on the pins 9 while pressing them lightly against the annular projections 10.

In the construction illustrated in FIG. 5 the foil 3 is reinforced at each of its free end portions where it is formed with the openings 13 with an elongated reinforcing strip 15 engaging the foil 3 at its free end portion and strengthening the foil 3 at the region where it is formed with the circular openings 13 so as to prevent undesirable enlargement of these openings 13 or even tearing of the foil 3 at the openings 13. With the embodiment of FIG. 5, the means for pressing the foil against the flange 2 or projection 10 takes the form of an elongated elastic springy member 16 fixed at an intermediate portion to the foil 3 as by being welded thereto at the pair of locations 17 illustrated in FIG. 5, so that the member 16 cannot turn relative to the foil 3. The springy member 16 has a pair of elongated free arms 18 respectively formed with elongated openings 19 which receive the pins 9, and the free end portions of the arms 18 which are provided with the openings 19 can be pushed over the enlarged portions 12 of the pins 9 so that these free end portions of the springy member 16 will engage the foil 3 to lightly urge the latter against the projection 10 shown in FIG. 2. Moreover, because of the elasticity of the material of the member 16 this member additionally serves to resiliently pull the foil 3 against the cutter means 5.

As is apparent from FIG. 6, the means for engaging the pins 9 to urge the foil 3 against the projections 10 can take the form of an elongated elastic strip 20 formed, for example, of synthetic plastic material, with lugs 21 and 22 which pass around the edges of the foil 3 and formed with the elongated openings 23 which receive the pins 9. The openings 23 of FIG. 6 as well as the openings 19 of FIG. 5 are made elongated so as to compensate for the manufacturing tolerances. The openings 23 are of such a size that the enlarged portions 12 can be pushed through the openings 23 of the elastic strip 20 and this strip will engage the portions 12 of the pins 9 in such a way as to urge the foil 3 lightly against the projections 10 of the pins 9. Because the strip 20 is provided with the lugs 21 and 22 which extend around the edges of the foil 3 in the manner illustrated in FIG. 6, this strip 20 serves the additional function of reinforcing the foil 3, particularly at the region of the openings 13 thereof, so that the single strip 20 of FIG. 6 performs the function of a reinforcing means as well as of a means for maintaining the foil on the pins and urging the foil against the friction surface of the frame means such as the surface of the annular projections 10 of the pins 9, as described above. As seen in FIG. 6, the strip 20 has edge portions 20a which extend beyond the corresponding edges of the thin shearing foil. It must be noted that the thickness of this foil may be in the range of 50 microns. By extending beyond the edges, in the aforesaid manner, the strip 20 has the two-fold function of protecting the thin shearing foil against damage and also protecting the user against injury resulting from cuts, which may be occasioned by careless handling of the shearing foil. As a reinforcing means the strip 20, of course, also facilitates assembly of the foil 3 onto the pins 9, since the pressure applied to the foil by the user during such assembly is distributed by the strip 20 more evenly along the edge portions of the foil to the region of the openings 13. By reinforcing the free end portions of the foil, the strips 20 also prevent damage to the portions of the foil surrounding the openings 13. Assembly of the foil with the shaver frame is therefore facilitated and can be readily accomplished by unskilled hands, without the use of tools, when such foil is reinforced and protected by the strips 20.

According to FIG. 7, the foil 3 can be formed with an opening 25 receiving a projection 24 of the lug 22 of FIG. 6 so as to provide a secure connection between the strip 20 and the foil 3, or, as indicated in FIG. 8, the lug 22 may be integrally joined with the remainder of the strip 20 by a portion of the material thereof which passes through the opening 25, and for this purpose the strip may be applied to a spot welder, for example, which will cause the material of the strip 20 to flow through the opening 25 to provide the structure shown in FIG. 8.

The structure shown in FIG. 9 includes a reinforcement 15 as described above in connection with FIG. 5, and in this embodiment there is also an elongated springy member 16' similar to the springy member 16 of FIG. 5 and joined at a pair of places 17 to the foil 3 so that the springy member cannot turn relative thereto and has a pair of elongated springy arms 18 formed with the openings 19 which receive the pins 9 in the manner described above in connection with FIG. 5. However, as will be seen from a comparison of FIG. 9 with FIG. 5, the springy member of FIG. 9 is positioned so that its openings 19 are offset upwardly, as viewed in FIG. 9, relative to the openings 13. With this construction when the foil 3 and the springy member of FIG. 9 are mounted on the pins 9, the springy member will be prestressed in such a way that the upper edges of the openings 13, as viewed in FIG. 9, will engage the pins 9 thus providing the largest possible degree of movement of the foil 3 relative to the pins 9 while at the same time increasing the effect of yieldably and resiliently urging the foil 3 against the cutter means 5. FIG. 5 shows the upper edges of the openings 13 in engagement with the pins 9 so that the maximum upward movement of the foil 3 relative to the pins 9, as viewed in FIG. 5, is afforded, and of course with the embodiment of FIG. 9 the springy member 10 will be prestressed to an extent greater than with the embodiment of FIG. 5, as a result of the offsetting of the springy member with respect to the openings 13, as illustrated in FIG. 9. Thus, with this construction the total of the difference between the diameter of the pin 9 and the opening 13 is available for compensating movement of the foil relative to the frame means. The springy force provided by the arms 18 in the embodiment of FIGS. 5 and 9 opposes the force of the spring 6.

As illustrated in FIG. 10, the strip 20 engaging the pins 9 to retain the foil 3 on the frame 2 and provide the requisite frictional resistance to movement between shearing foil 3 and frame 2, can be positioned on the outer surface of the shearing foil 3, i.e., that surface thereof which is closest to the frame 2. Since the vertical height of elongated openings 23, in strip 20, is less than the diameter of circular openings 13, as seen in FIGS. 6 and 10, portions of the strip 20 cover part of the openings 13. The inherent elastic properties of the strip 20, which is anchored to the foil 3 with lugs 21, 22 at locations spaced from openings 13, permits some automatic adjustment of foil 3 with respect to the pins 9 to compensate for manufacturing tolerances.

In the embodiment illustrated in FIG. 10, the strip 20 constitutes the means for engaging pins 9 to urge the strip 20, and therewith the foil 3, against the projections 10. It may be said with respect to this embodiment that since foil 3 is connected to strip 20, it is urged into engagement with the frame 2 via the intermediary strip 20.

Figure 11:
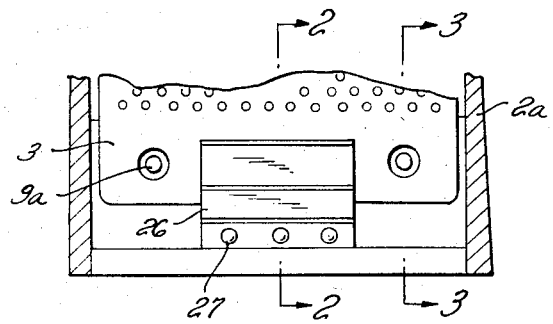
FIG. 11 is a transverse sectional view showing fragmentarily a modified structure for pressing part of a shearing foil against the frame of the shaver.

In the construction according to FIG. 11, the means for pressing the foil against the frame 2a takes the form of a springy, tongue-like member 26 fixed at one end portion thereof to the frame 2a, as by rivets 27, and having a free end portion extending upwardly into overlapping relationship with the inner side of an end portion of foil 3. The means for pressing the foil 3 against the frame being, therefore, carried by frame 2a itself.

Figure 12:
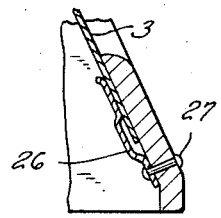
FIG. 12 is a fragmentary, sectional, side elevation of the modification illustrated in FIG. 11, viewed in the direction of arrows 2—2.
Figure 13:
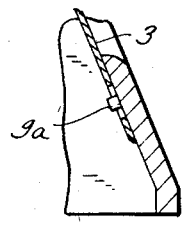
FIG. 13 is a fragmentary, sectional, side elevation of the modification illustrated in FIG. 11, viewed in the direction of arrows 3—3.

The springy member 26 may have a bent-up central portion, as seen in FIG. 12, so as to provide improved spring action for pressing the foil 3, inserted between spring 26 and frame 2a, against the inner surface 11 of the frame 2a. As seen in FIG. 13, a pair of relatively short locating pins 9a are provided on the frame 2a to locate each foil end portion with respect to the frame. The foil 3 is provided, as previously noted, with openings 13 whose size substantially exceeds the cross section of the pins 9a, respectively. In all other respects, frame 2a is identical with frame 2 illustrated in FIGS. 1 to 10.

Figure 14:
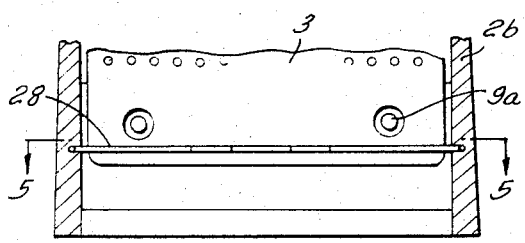
FIG. 14 is a transverse sectional view showing fragmentarily a further modification of a structure for pressing part of the shearing foil against the frame of the shaver.
Figure 15:
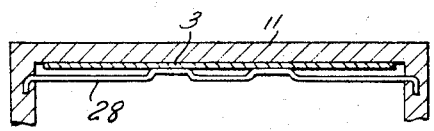
FIG. 15 is a fragmentary horizontal sectional view of the arrangement illustrated in FIG. 14.
Figure 16:
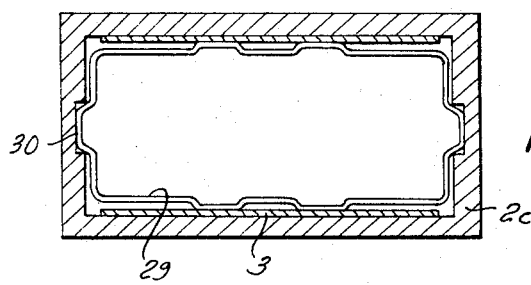
FIG. 16 is a horizontal sectional view showing a still further modified structure for pressing opposite free end portions of a shearing foil against the frame of the shaver.

An alternate construction is shown in FIGS. 14–16. In the construction illustrated in FIGS. 14–15, for example, the means for pressing the foil 3 against the frame 2b takes the form of a pair of spring-wires 28 (only one of which is shown) each anchored at opposite ends thereof, respectively, in opposite end walls of frame 2b and having an intermediate portion extending closely adjacent to and substantially parallel with the inner surface 11 of a side wall of frame 2b, at a location below the pins 9a, as viewed in FIG. 14.

Each of the free end portions of foil 3 are positioned intermediate the respective one of the wire spring members 28 and the inner side of the corresponding side wall of frame 2b. As best seen in FIG. 15, the intermediate portion of spring member 28 presses the end portion of foil 3 against the frame.

In the construction illustrated in FIG. 16, the means for pressing the foil against the frame 2c takes the form of a substantially rectangular endless wire spring member 29 extending substantially horizontally along the interior surface of the side and end walls of frame 2c, the latter being formed at opposite end walls thereof with a pair of recesses. The rectangularly shaped spring member 29 is provided with outwardly bent portions 30 at opposite shorter sides thereof which are respectively received in the corresponding recesses of the frame. In this manner the spring member 29 is retained in position in the frame 2c. The opposite longer sides of the rectangularly shaped spring member 29 engage, respectively, the opposite free end portions of the foil 3, pressing the latter respectively against the respective inner sides of the side walls of frame 2c.

It is apparent that with the above-described structure of the invention the foil 3 is given a more or less floating mount in such a way that it is not rigidly connected to the frame and instead is capable of automatically adapting itself to the cutter 5 so as to have a uniform sliding engagement therewith guaranteeing the desired shearing action of the shaver. It has been found that the structure of the invention is capable of automatically compensating for even relatively large manufacturing tolerances and will provide a faultless centering of the cutter 5 and the foil 3 relative to each other, with each corner of the foil automatically adjusting itself independently of the other corners while at the same time any vibrations of the foil are reliably avoided in the manner described above. The best possible contact between the foil and cutter is achieved with the structure of the invention while maintaining a relatively light friction between the foil and the frame of the shaver.

It will be understood that each of the elements described above, or two or more together, may also find a useful application in other types of shavers differing from the types described above.

While the invention has been illustrated and described as embodied in dry shavers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a shaving apparatus, in combination, frame means having a pair of fastening portions; a cutter carried by said frame means movably relative thereto in at least two directions; shearing foil means extending around and engaging with its inner side said cutter and having a pair of end portions overlapping said frame means; and an engaging assembly engaging said end portions of said foil means and said frame means, said foil means, including said end portions thereof, being movable relative to said frame means with universal play in the plane in which said end portions of said foil means overlap said fastening portions of said frame means so that the inner side of said shearing foil means is adapted to maintain contact with said cutter during movement of the same in said two directions, said engaging assembly including a plurality of first members carried by one of said means, the other of said means being formed with openings through which said first members respectively pass with substantial clearance so as to permit considerable freedom of movement of said foil means relative to said frame means, and second members operatively associated with said frame means and engaging said end portions of said foil means for urging the latter against said frame means to provide a relatively light frictional resistance to movement of said foil means relative to said frame means.

2. In a shaving apparatus, in combination, frame means having a pair of fastening portions; a cutter carried by said frame means movably relative thereto in at least two directions; shearing foil means extending around and engaging with its inner side said cutter and having a pair of end portions overlapping said frame means; and an engaging assembly engaging said end portions of said foil means and said frame means, said foil means, including said end portions thereof, being movable relative to said frame means with universal play in the plane in which said end portions of said foil means overlap said fastening portions of said frame means so that the inner side of said shearing foil means is adapted to maintain contact with said cutter during movement of the same in said two directions, said engaging assembly including a plurality of first members carried by one of said means, the other of said means being formed with openings through which said first members respectively pass with substantial clearance so as to permit considerable freedom of movement of said foil means relative to said frame means, and second members operatively associated with said frame means and engaging said end portions of said foil means for urging the latter against said frame means to provide a relatively light frictional resistance to movement of said foil means relative to said frame means, said second members comprising a springy element having a first portion directly secured to said frame means and a second portion engaging an end portion of said foil means at the inner side thereof for pressing said foil means against said frame means.

3. In a shaving apparatus according to claim 2, wherein said springy element is a wire-like element, and wherein said first portion thereof is constituted by opposite end sections directly anchored in said frame means and said second portion thereof is an intermediate section intermediate said end sections.

4. In a shaving apparatus according to claim 3, wherein said wire-like springy element forms a substantially rectangular body having a pair of opposite longer sides and a pair of opposite shorter sides, said opposite shorter sides being anchored in said frame means.

5. In a shaving apparatus according to claim 4, said frame means having a pair of opposite longer side walls and a pair of opposite shorter end walls defining between themselves a compartment having a substantially rectangular outline and said rectangular body formed by said wire-like spring element being snugly received in said compartment within said substantially rectangular outline, said free end portions of said foil means being located, respectively, intermediate a longer side of said springy element and the corresponding side wall of said frame means.

References Cited

UNITED STATES PATENTS

| | | | |
|---|---|---|---|
| 3,269,008 | 8/1966 | Messinger et al. | 30—43.91 |
| 2,203,020 | 6/1940 | Jones | 30—43.92 |
| 2,229,959 | 1/1941 | Dalkowitz | 30—43 |
| 2,263,155 | 11/1941 | Wright | 30—34.1 |
| 2,282,943 | 5/1942 | Dalkowitz | 30—43 |
| 2,334,994 | 11/1943 | Dalkowitz | 30—43.91 |
| 2,979,819 | 4/1961 | Kleinman | 30—43.91 |
| 3,068,568 | 12/1962 | Schnapp | 30—34.1 |
| 3,074,161 | 1/1963 | Liska | 30—43.92 |

MYRON C. KRUSE, *Primary Examiner.*